(12) United States Patent
Phadke et al.

(10) Patent No.: US 9,378,109 B1
(45) Date of Patent: Jun. 28, 2016

(54) TESTING TOOLS FOR DEVICES

(71) Applicant: Amazon Technologies, Inc., Reno, NV (US)

(72) Inventors: Raghav Kishor Phadke, Seattle, WA (US); Anderson Kailodge Quach, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 217 days.

(21) Appl. No.: 14/014,815

(22) Filed: Aug. 30, 2013

(51) Int. Cl.
*G06F 11/263* (2006.01)

(52) U.S. Cl.
CPC ..................... *G06F 11/263* (2013.01)

(58) Field of Classification Search
USPC ........................................................ 714/32
See application file for complete search history.

(56) References Cited

U.S. PATENT DOCUMENTS

| | | | | |
|---|---|---|---|---|
| 6,546,476 | B1 * | 4/2003 | Gillingham ................... | 711/167 |
| 8,578,336 | B1 * | 11/2013 | Wiradarma et al. .......... | 717/125 |
| 8,996,742 | B1 * | 3/2015 | Spinner et al. ............... | 710/8 |
| 9,164,874 | B1 * | 10/2015 | Tomay ................ | G06F 11/366 |
| 2001/0047406 | A1 * | 11/2001 | Araujo et al. ................. | 709/223 |
| 2005/0086022 | A1 * | 4/2005 | Lindberg et al. .............. | 702/123 |
| 2006/0085681 | A1 * | 4/2006 | Feldstein et al. .............. | 714/25 |
| 2008/0256394 | A1 * | 10/2008 | Rashevsky et al. ........... | 714/38 |
| 2009/0204591 | A1 * | 8/2009 | Kaksonen ......................... | 707/3 |
| 2009/0276609 | A1 * | 11/2009 | Moyer et al. .................. | 712/220 |
| 2010/0095234 | A1 * | 4/2010 | Lane ..................... | G06F 3/0416 |
| | | | | 715/773 |
| 2011/0004460 | A1 * | 1/2011 | Duffie et al. .................... | 703/28 |
| 2011/0270567 | A1 * | 11/2011 | Mow et al. ..................... | 702/120 |
| 2013/0166243 | A1 * | 6/2013 | Huang et al. .................. | 702/108 |
| 2014/0082422 | A1 * | 3/2014 | Yang .............................. | 714/37 |
| 2014/0107976 | A1 * | 4/2014 | Kallfelz et al. ................ | 702/182 |
| 2015/0046909 | A1 * | 2/2015 | Ligman ............... | G06F 11/3688 |
| | | | | 717/131 |

* cited by examiner

*Primary Examiner* — Kamini Patel
(74) *Attorney, Agent, or Firm* — Sutherland Asbill & Brennan LLP (57) ABSTRACT

This disclosure describes systems, methods, and computer-readable media related to testing tools for devices. In some embodiments, input may be received by a user device from a user. The input may include semantic inputs and analysis parameters. The semantic inputs may be converted to test events. The test events may be transmitted to a device for testing. The user device may receive a first set of data from the device and a second set of data from a camera. The second set of data may be processed. Test results may be generated based at least in part on the analyzed first set of data and the processed second set of data. The generated test results may be presented to the user.

24 Claims, 5 Drawing Sheets

TESTING TOOLS FOR DEVICES

BACKGROUND

Mobile devices are becoming more prevalent and often are available as different types of devices, such as electronic readers (also called "e-readers"), smartphones, tablets, laptops, and the like. Different types of mobile applications may be available on such mobile devices. Because mobile devices have different hardware and software components, such as different types of memory or different operating systems, electronic content and applications may be rendered differently on the various types of devices. In some cases, the differences across the various types of mobile devices may affect the experience of a user.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques, and methodology for testing tools for devices. As an illustrative example, a tester may specify a test suite which may comprise one or more test events using a test controller device, such as a computer, a laptop, or a mobile device. A test event may include commands to initiate or launch one or more applications, commands to open content, commands to traverse through the content, or commands to process one or more gesture-based inputs, such as a tap gesture, a touch gesture, or a swipe gesture. The tester may also specify one or more analysis parameters, which may indicate the type of analysis to perform on data collected as a result of the execution of the test events. The test controller device may transmit the test events to a test device, such as an e-reader, for testing.

A module on the test device (e.g., e-reader) may receive the test events and analysis parameters and initiate execution of the test events. For example, the module may initiate test events to open an e-book on the e-reader and traverse through the content. The module may then collect data based at least in part on the execution of the test events, such as the time it takes to load the content or the time it takes to render each page of the content on the e-reader based on the traversal through the content. The module may then generate analyzed data based at least in part on the collected data and the analysis parameters. For example, the collected data may be associated with memory consumption of the e-reader. The module may analyze the collected data to generate analyzed data based at least in part on the collected data and the analysis parameters. The module may then transmit the collected data and the analyzed data to the test controller device for presentation to the tester.

A high-speed camera may be positioned to face the display of the test device (e.g., e-reader) to capture video data of the e-reader display as it renders the content in response to the execution of the test events. The camera may then transmit the video data to the test controller device for further analysis.

A module on the test controller device may receive the data from the e-reader as well as the data from the high-speed camera. The data from the e-reader may include the raw collected data and the analyzed data. The module may process the data received from the high-speed camera by parsing the video data and applying computer vision techniques to the parsed data. For example, the computer vision techniques may include object identification techniques. The module may generate test results based at least in part on the analyzed data from the e-reader and the processed data from the high-speed camera to ensure the analyzed data is accurate. In some embodiments, the module may then generate a report based on the analyzed data from the e-reader. In some embodiments, the analyzed data from the e-reader may be transmitted to a datastore.

In some embodiments, the test controller device may have a module that enables semantic inputs from a tester. A semantic input module of the test controller device may receive semantic input from a tester. For example, a tester may provide input through a meta-language, such as Extended Markup Language (XML), to drive automated test suites. A tester may provide semantic inputs (e.g., inputs which drive and configure each test event of a test suite) which may be translated by the semantic input module into machine-readable test events (e.g., data structures, classes, sequence of test events, etc.). Test events may include, but are not limited to, commands to launch or execute applications, open content of various content types (e.g., electronic books, music, video, magazines, websites, applications, etc.), or process gesture-based inputs. Semantic inputs may enable non-technical testers to write complex automated test suites exercising a large portion of the device's functionality. Semantic inputs may reduce the burden of developing complex automation by allowing testers to specify purely semantic input (e.g., in XML form), such as a touch gesture on specified text and identifying the frame-rate of animation in frames per second (FPS). For example, the tester may provide semantic inputs through an XML tag with an FPS attribute to produce automated tests on the device.

In some embodiments, the test device (e.g., e-reader) may include an analysis module that may include a device performance automation (DPA) engine. A DPA engine may collect raw data on a test device (e.g., e-reader) and/or generate analyzed data on the test device. The DPA engine may process the raw data from a test device based at least in part on one or more analysis parameters provided by the tester. The DPA engine may generate one or more calculations or determinations that measure different aspects of a test device, such as latency measurements associated with rendering content on the test device.

In some embodiments, the test controller device may include an analysis module that may include an automatic visual analysis (AVA) engine. In some embodiments, the AVA engine may calculate end-to-end render time latencies of transitions (e.g., transitions of pages of content) and identify when the screen is animated and when the screen is static. The AVA engine may augment the processing by the DPA engine to generate end-to-end render time latencies. The AVA engine may use video data received from a high-speed video recording device of the screen of the test device (e.g., e-reader) to calculate latencies for each transition in the test suite developed by a tester using semantic inputs. The AVA engine may then post-process the results generated by the DPA engine to associate a name with each latency it calculated. The name for each transition may be specified by the tester. The AVA engine may parse the data received from the one or more high-speed cameras to identify the regions of the display the test device (e.g., e-reader) is rendering.

The combination of the DPA engine and the AVA engine may enable testers to compose robust automated test events quickly, while the AVA engine may ensure the latency times calculated by the DPA engine are accurate. In some embodiments, the AVA engine may generate results that may not be able to be calculated by the DPA engine, such as identification of the regions of the display of the test device that are rendered. The test controller device may correlate the latency data generated by the AVA engine to the low-level rendering pipeline, which may demonstrate gaps between what the tester is seeing and what the rendering pipeline is doing and why.

In some embodiments, the analysis module on the test device (e.g., e-reader) may allow a tester to examine the performance of the applications on a test device alongside data from the system of the test device. For example, the analysis module may provide contextual data from the operating system of the test device, such as garbage collection. The garbage collection processes of the test device may be handled in a way that is not transparent to customer-facing applications, even though an application may benefit if it is written in a way that minimizes garbage collection. Another example is the low-level rendering pipeline, where an application may hand off rendering to the operating system that eventually hands it off to the hardware in a way that is not transparent to the application.

The analysis module may collect system-level data, which may provide contextual data for an application being tested on the test device. System-level data may be leveraged to calculate the drawing latency of transitions and the fluidity of animations while automating actions within an application. System-level data may also indicate problems which application-level data cannot. Analysis of the garbage collection and comparing applications with high and low amounts of garbage collections may allow testers to drive measurable performance improvements for an application executed on the test device.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way.

It should be appreciated that numerous other embodiments, variations, and so forth are within the scope of this disclosure.

Illustrative Use Cases and System Architecture

Figure 1:
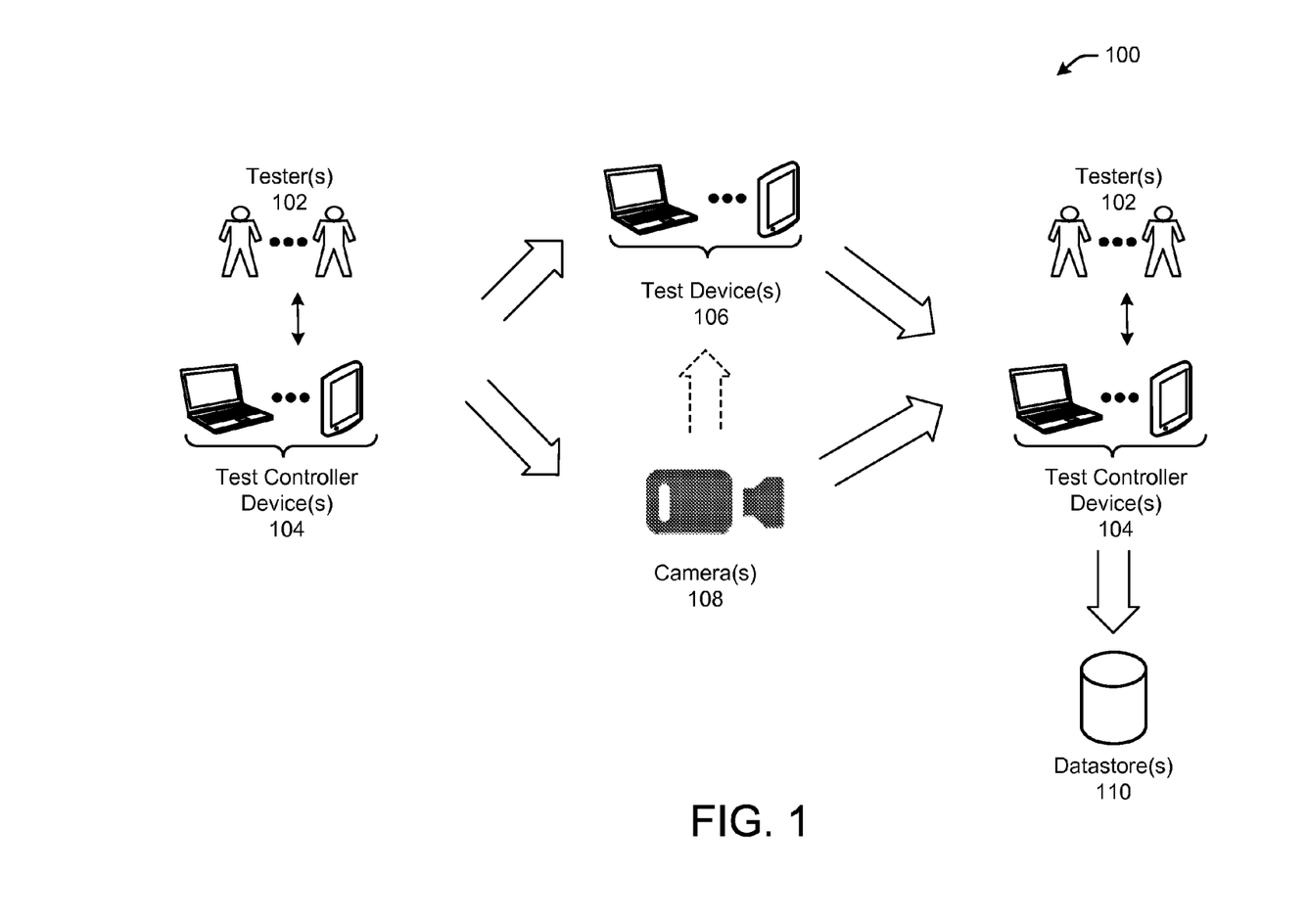
FIG. 1 depicts an illustrative data flow between various components of an illustrative system architecture for testing tools for devices in accordance with one or more embodiments of the disclosure.

FIG. 1 depicts an illustrative data flow between various components of an illustrative system architecture for testing tools for devices in accordance with one or more embodiments of the disclosure. One or more illustrative test controller device(s) 104 operable by one or more tester(s) 102 are illustratively depicted in FIG. 1. The test controller device(s) 104 may include any suitable processor-driven computing device including, but not limited to, a desktop computing device, a laptop computing device, a server, a smartphone, a tablet, and so forth. For ease of explanation, the test controller device(s) 104 may be described herein in the singular; however, it should be appreciated that multiple test controller device(s) 104 may be provided.

The test controller device 104 may receive input from one or more tester(s) 102. In some embodiments, the tester 102 may provide input for a test suite comprising one or more test events to execute on the test device 106. The tester 102 may also provide input indicating a type of analysis to perform in conjunction with the different test events executed on the test device 106. For example, the input may indicate to perform a specified sequence of testing events to measure the performance of and effect on the rendering of content on the test device 106 and to obtain and analyze the data to generate performance measurements associated with the rendering of content on the test device 106.

In some embodiments, the tester 102 may provide input to the test controller device 104 in the form of semantic input. The use of semantic inputs may enable a tester 102 to specify the types of tests to be implemented by the test device 106 via human-readable input which may ultimately be translated or converted into machine-readable test events. For example, the tester 102 may provide semantic input (e.g., in XML form) to simulate a touch-gesture on the screen of the test device 106. The test controller device 104 may then take the semantic input provided by the tester 102 and convert the semantic input into machine-readable test events, such as determining the coordinates of the screen of the test device 106 to mimic a touch-gesture event. The test controller device 104 may transmit the test suite (e.g., one or more test events) to a test device 106 for execution.

The test device(s) 106 may receive the test suite from the test controller device 104. The test device(s) 106 may include any suitable processor-driven computing device including, but not limited to, a desktop computing device, a laptop computing device, a server, a smartphone, a tablet, and so forth. For ease of explanation, the test device(s) 106 may be described herein in the singular; however, it should be appreciated that multiple test device(s) 106 may be provided.

The test device(s) 106 may initiate execution of the test suite received from the test controller device 104. The test device(s) 106 may collect data based at least in part on the execution of the test events of the test suite. In some embodiments, the test device(s) 106 may generate analyzed data based at least in part on the collected data and one or more analysis parameters received from the tester 102 via the test controller device 104. In some embodiments, the test device(s) 106 may transmit the collected data and/or the analyzed data to the test controller device 104 for further analysis. In some embodiments, the test device(s) 106 may analyze the collected data and transmit the analyzed data to the test controller device 104 for presentation.

One or more high-speed camera(s) 108 may be positioned to capture changes on the display of the test device(s) 106. The high-speed camera(s) 108 may include a network-enabled web camera, a single-lens reflex (SLR) camera with video recording capabilities, a video camera, a television camera, a camcorder, or the like. The high-speed camera(s) 108 may capture changes on the display of the test device(s) 106 executing a testing suite received from a test controller device 104 in video format. In some embodiments, the high-speed camera(s) 108 may receive an indication that the testing suite is completed. In some embodiments, the high-speed camera(s) 108 may detect when there are no further changes or animations on the display of the test device(s) 106. The high-speed camera(s) 108 may transmit the captured video data to the test controller device 104. In some embodiments, the high-speed camera(s) 108 may transmit the captured video data to the test controller device 104 over a wired or wireless network. In some embodiments, the captured video data may be transmitted to the test controller device 104 through a communicative link, such as Bluetooth, universal serial bus, or the like.

The test controller device 104 may receive data generated by the test device(s) 106 as well as data from the high-speed camera(s) 108. The test controller device 104 may receive raw collected data and analyzed data. The analyzed data may have been generated by the test device 106 based at least in part on analysis parameters provided by the tester 102. The test controller device 104 may also process the data received from the high-speed camera 108 by parsing the video data and applying computer vision techniques to the parsed data, such as object recognition techniques. The test controller device 104 may generate test results based at least in part on the analyzed data from the test device 106 and the processed data from the high-speed camera 108. In some embodiments, leveraging the different sets of data may ensure that the test results are accurate. In some embodiments, the test controller device 104 may then generate a report based on the analyzed data from the test device 106. The report may include the data analyzed by the test device 106, data associated with the validation of the analyzed data, and/or the processed data from the high-speed camera 108. In some embodiments, the report, the analyzed data, and/or the generated test results may be presented to the tester 102. In some embodiments, the analyzed data from the test device 106 and/or the generated report may be transmitted to a datastore 110.

Figure 2:
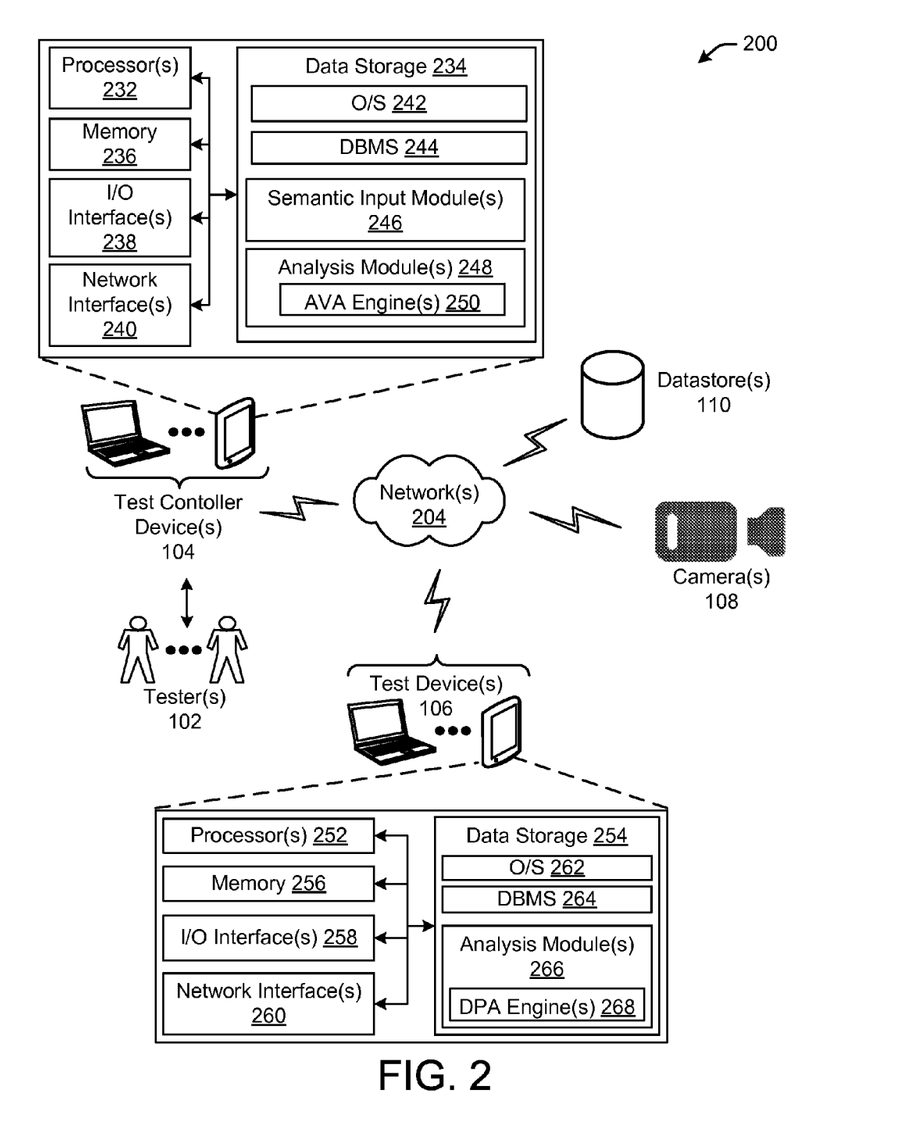
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more test controller devices 104 operable by one or more tester(s) 102, one or more test device(s) 106, one or more high-speed camera(s) 108, and/or one or more datastore(s) 110. The test controller device(s) 104 may include any of the types of devices described through reference to FIG. 1. The test device(s) 106 may include any of the types of devices described through reference to FIG. 1. The high-speed camera(s) 108 may include any of the types of devices described through reference to FIG. 1.

Any of the test controller device(s) 104, test device(s) 106, high-speed camera(s) 108, and/or datastore(s) 110 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The test controller device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the test controller device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The test controller device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The test controller device(s) 104 may further include network interface(s) 240 that facilitate communication between the test controller device(s) 104 and other devices of the illustrative system architecture 200 (e.g., test device(s) 106, high-speed camera(s) 108, etc.) or application software via the network(s) 204. The test controller device(s) 104 may additionally include one or more input/output (I/O) interfaces 238 (and optionally associated software components such as device drivers) that may support interaction between a tester 102 and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the test controller device 104 and the hardware resources of the test controller device 104. More specifically, the O/S 242 may include a set of computer-executable instructions for managing the hardware resources of the test controller device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 110). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more semantic input module(s) 246 and/or one or more analysis module(s) 248. The analysis module 248 may include one or more automatic visual analysis (AVA) engine(s) 250.

The semantic input module(s) 246 may include computer-executable instructions that in response to execution by the processor(s) 232 cause operations to be performed including receiving input from a tester 102. The semantic input module 246 may determine whether the input received from the tester 102 is semantic input. If the input received from the tester 102 is not semantic input, the semantic input module 246 may transmit the input from the tester 102 to the test device 106. If the input received from the tester 102 is semantic input, the semantic input module 246 may convert the semantic input into a machine-readable test suite that may include one or more test events. Semantic input may be human-readable input that may be received by the test controller device 104 in XML form. The semantic input may be translated or converted into machine-readable test events. The semantic input module 246 may transmit the test suite (e.g., one or more test events) to a test device 106 for execution.

The analysis module(s) 248 may include computer-executable instructions that in response to execution by the processor(s) 232 cause operations to be performed including processing data received from one or more high-speed cameras 108 and/or validating analyzed data received from one or more test device(s) 106. The analysis module 248 may include an AVA engine 250. The AVA engine 250 may include computer-executable instructions that in response to execution by the processor(s) 232 cause operations to be performed including receiving data from one or more high-speed camera(s) 108 and/or processing the data received from the one or more high-speed camera(s) 108. The AVA engine 250 may process the data received from the one or more high-speed camera(s) 108 by parsing the data (e.g., video data) and applying computer vision techniques to the parsed data, such as object recognition techniques. The AVA engine 250 may transmit the processed data to the analysis module 248. The analysis module 248 may leverage the processed data from the AVA engine 250 and the data analyzed from one or more test device(s) 106 (e.g., DPA engine 268) to generate test results. In some embodiments, using different sets of data to generate test results may ensure accuracy of the analyzed data.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The test device(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the test device(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The test device(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The test device(s) 106 may further include network interface(s) 260 that facilitate communication between the test devices 106 and other devices of the illustrative system architecture 200 (e.g., test controller device(s) 104, high-speed camera(s) 108, etc.) or application software via the network(s) 204. The test device(s) 106 may additionally include one or more input/output (I/O) interfaces 258 (and optionally associated software components such as device drivers) that may support interaction between a tester 102 and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the test device(s) 106 and the hardware resources of the test device(s) 106. More specifically, the O/S 262 may include a set of computer-executable instructions for managing the hardware resources of the test device(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 110). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more analysis module(s) 266. The analysis module 266 may include one or more data performance automation (DPA) engine(s) 268.

The analysis module(s) 266 may include computer-executable instructions that in response to execution by the processor(s) 252 cause operations to be performed including collecting data in response to execution of the test suite on the test device 106, where the test suite may include one or more test events. The analysis module 266 may include a DPA engine 268. The DPA engine 268 may include computer-executable instructions that in response to execution by the processor(s) 252 cause operations to be performed including executing a test suite that includes one or more test events, collecting data in response to the execution of the test suite, and/or generating analyzed data based at least in part on the collected data and one or more analysis parameters received from a tester 102 via a test controller device 104. The analysis module 266 may transmit the collected data and the analyzed data to the test controller device 104.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
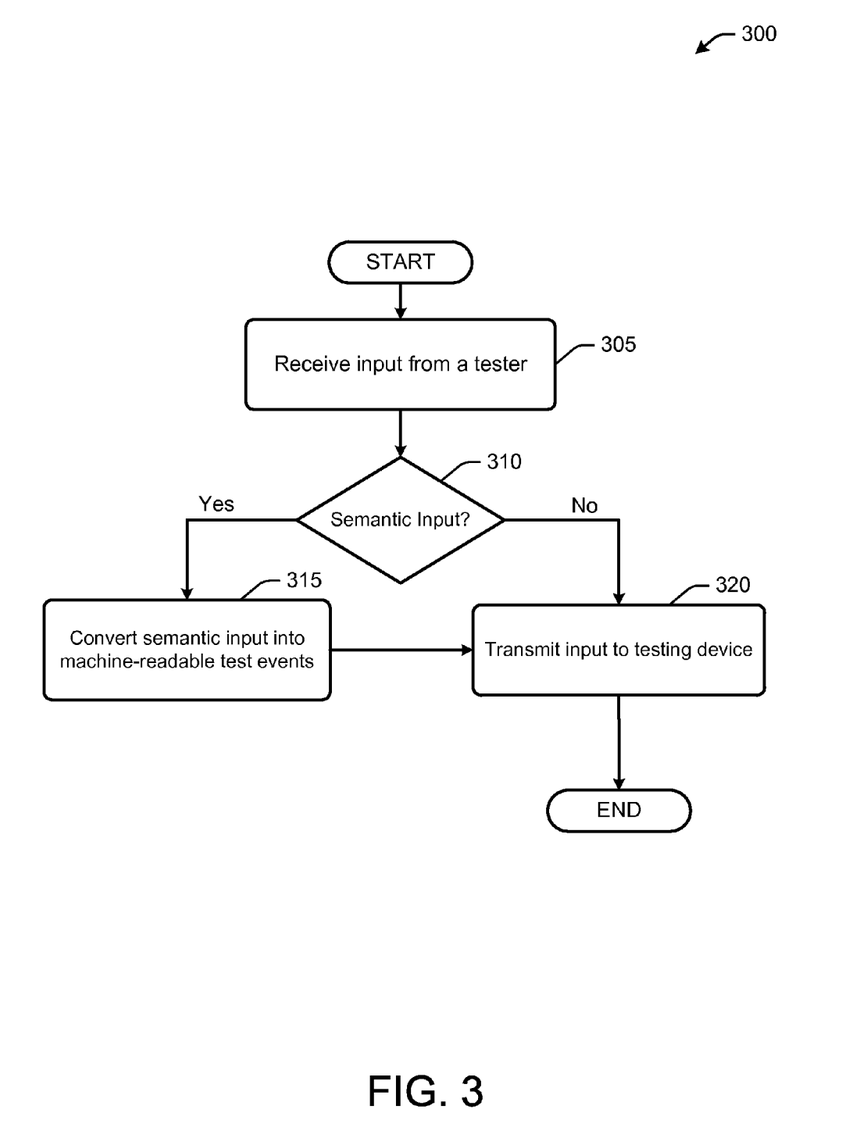
FIG. 3 is a process flow diagram of an illustrative method for semantic inputs for testing tools for devices in accordance with one or more embodiments of the disclosure.

FIG. 3 is a process flow diagram of an illustrative method 300 for semantic inputs for testing tools for devices in accordance with one or more embodiments of the disclosure. At block 305, a test controller device 104 may receive input from a tester 102. At block 310, the semantic input module 246 of the test controller device 104 may determine whether the input received from the tester 102 is semantic input. If the semantic input module 246 determines that the input received from the tester 102 is semantic input, at block 315, the semantic input module 246 may convert the received input into machine-readable test events. For example, a tester 102 may have provided semantic input in XML form. Test events may include, but are not limited to, commands to launch or execute applications, open content of various content types (e.g., electronic books, music, video, magazines, websites, applications, etc.), or process gesture-based inputs.

If at block 310, the semantic input module 246 determines that the input received from the tester 102 is not semantic input, then at block 320, the semantic input module 246 may transmit the input from the tester 102 to a test device 106. For example, a tester 102 may have provided input in the form of machine-readable test events that do not need conversion or translation and may be directly transmitted to a test device 106 for execution.

Figure 4:
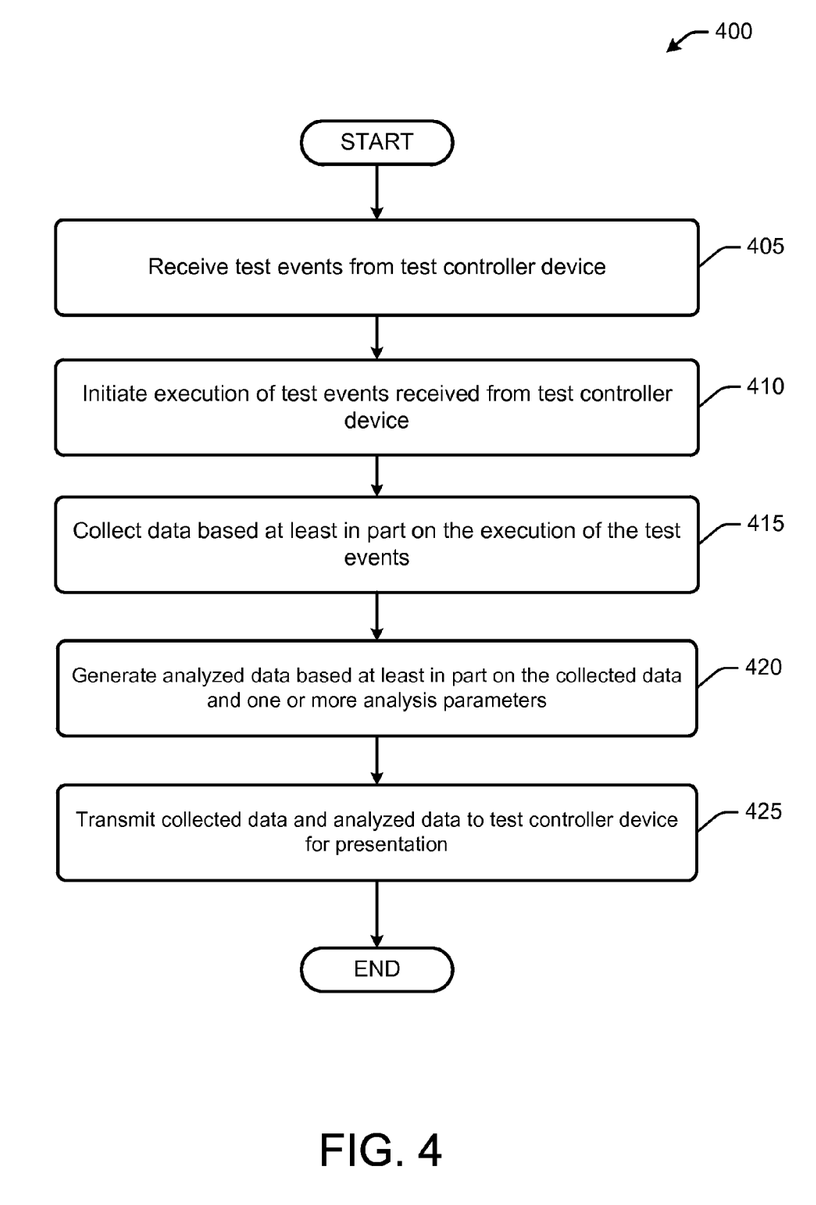
FIG. 4 is a process flow diagram of an illustrative method for executing a test suite in a testing tool for devices in accordance with one or more embodiments of the disclosure.

FIG. 4 is a process flow diagram of an illustrative method 400 for executing a test suite in a testing tool for test devices 106 in accordance with one or more embodiments of the disclosure. At block 405, a test device 106 may receive one or more test events from a test controller device 104. In some embodiments, the test events may include data structures, classes, sequence of steps to execute, and the like. The test device 106 may also receive one or more analysis parameters from a tester 102 through a test controller device 104. At block 410, the analysis module 266 of the test device 106 may initiate execution of the one or more test events received from the test controller device 104. For example, when executed, the test events may launch or execute one or more applications, and load content of various types on the test device 106, such as electronic books, music, videos, magazines, websites, applications, and the like. In some embodiments, the analysis module 266 may execute test events that, when launched or initiated, may simulate actions that may be taken by a user of the test device 106, such as a reader of an e-reader. In some embodiments, the test events may include, but are not limited to, launching one or more applications on the test device 106, opening content (e.g., e-book, music, video, website, etc.), traversing through the content, closing content, switching content, acquiring content, deleting content, archiving content, restarting the test device 106, or processing gesture-based inputs, such as a touch gesture, a tap gesture, and/or a swipe gesture.

At block 415, the analysis module 266 may collect data based at least in part on the execution of the test events. The analysis module 266 may collect raw data from the test device 106 in response to the execution of one or more test events.

At block 420, the DPA engine 268 of the analysis module 266 may generate analyzed data based at least in part on the collected data and one or more analysis parameters. In some embodiments, an analysis parameter may specify to aggregate collected data and compute a mean value associated with a particular measurement, compute a standard deviation for a particular type of measurement, and the like. For example, an analysis parameter may specify to calculate a mean transition time for all the transitions that were performed by the test device 106 within a 10 minute period or after executing a specific test event a pre-determined number of times.

The DPA engine 268 may analyze the data collected by the test device 106. In some embodiments, the DPA engine 268 may analyze the data collected by the test device 106 based at least in part on analysis parameters received from a tester 102. For example, the tester 102 may have provided analysis parameters at the time the tester 102 provided input for the test events. In some embodiments, the DPA engine 268 may determine one or more transition times, fluidity, click to critical functions, and tap to highlight, and/or tap to animate measurements.

The DPA engine 268 may determine the duration of a transition, from the time the transition starts to when the display of the test device 106 becomes static. Analyzing data collected by the test device 106, the DPA engine 268 may infer the end of a transition based at least in part on the latter of rendering termination by an application on the test device 106 or the end of a window animation. In order to determine an accurate transition time, the DPA engine 268 may determine whether an application on the test device 106 does not require any further animation after the completion of the transition, or the DPA engine 268 may capture the animation after the completion of the transition, thus resulting in an artificially inflated transition time. If an application requires animation after finishing a transition, an accurate transition measure may not be able to be determined. In such a scenario, alternate techniques may be used by the DPA engine 268 to determine launch performance.

In some embodiments, the DPA engine 268 may analyze the raw data collected by the test device 106 to determine the fluidity of an executing application on a test device 106. The DPA engine 268 may analyze the raw data collected by the test device 106 to determine the frame updates based at least in part on the system events of a test device 106 and may calculate the frame updates in frames per second (FPS).

In some embodiments, the DPA engine 268 may analyze the raw data collected by the test device 106 to determine a click to critical functions (CTCF) measurement. The CTCF measurement may indicate how long it takes for critical elements to be rendered by the test device 106. Examples of critical elements may include a "Purchase Now" button in an application or a button to traverse forward or backward through content rendered on the display of the test device 106.

In some embodiments, the DPA engine 268 may analyze the raw data collected by the test device 106 to measure latency from a transition start point (e.g., before each step gets executed) to an arbitrary trace point. This approach allows a tester 102 to measure the latency of any critical point in the application of a test device 106.

In some embodiments, the DPA engine 268 may analyze the raw data collected by the test device 106 to determine a tap-to-highlight measurement that indicates the elapsed time between tapping a button on a display of the test device 106 to the button becoming highlighted. In some embodiments, the DPA engine 268 may measure the initial rendering via a paint analysis.

In some embodiments, the DPA engine 268 may analyze the raw data collected by the test device 106 to determine a tap-to-animation measurement that indicates the elapsed time between tapping a button to initiation of animations. The DPA engine 268 may measure the initial animation utilizing an animation analysis on the raw data collected from the test device 106. In some embodiments, the DPA engine 268 may calculate memory usage and CPU utilization associated with the test device 106, per process.

At block 425, the analysis module 266 may transmit the raw collected data and the generated analyzed data to the test controller device 104 for presentation to the tester 102.

Figure 5:
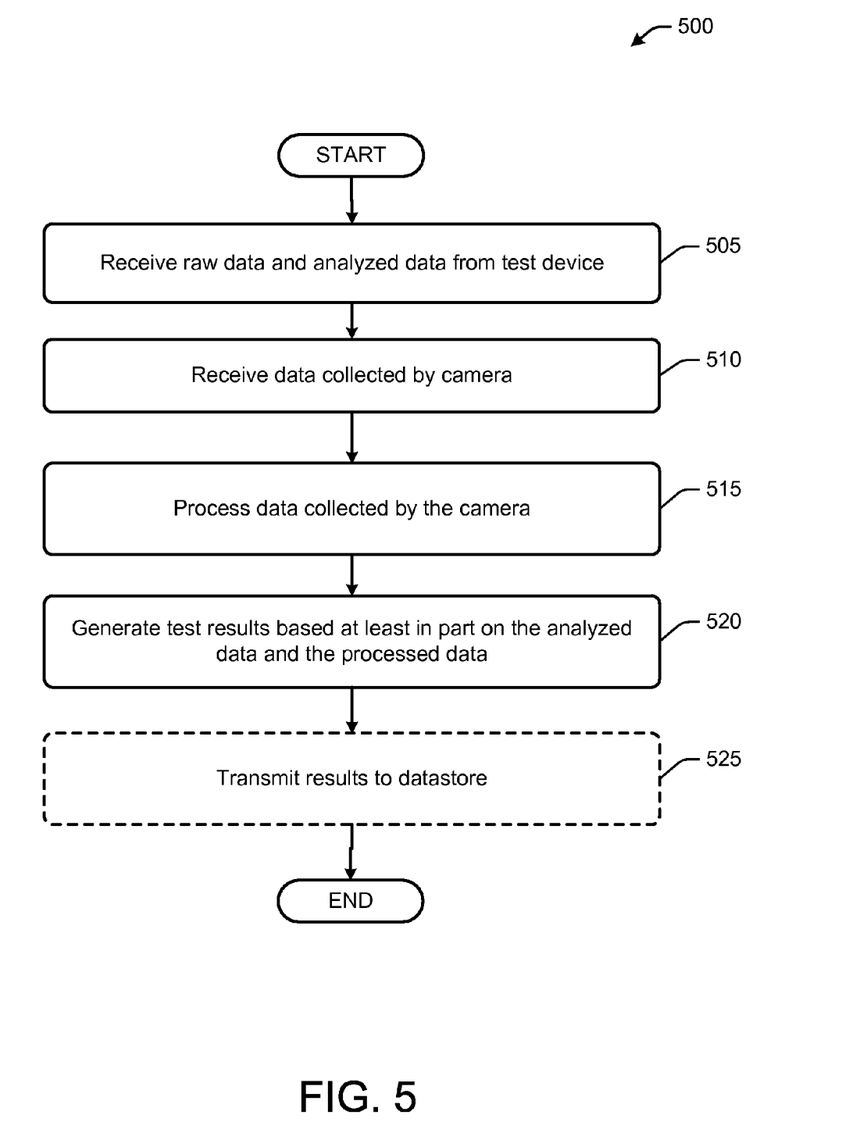
FIG. 5 is a process flow diagram of an illustrative method for processing data from a testing suite in a testing tool for devices in accordance with one or more embodiments of the disclosure.

FIG. 5 is a process flow diagram of an illustrative method 500 for processing data from a testing suite in a testing tool for devices in accordance with one or more embodiments of the disclosure. At block 505, the test controller device 104 may receive raw data collected by the test device 106 as well as analyzed data generated by the test device 106. The analyzed data from the test device 106 may be associated with system-level or application-level data collected and analyzed by the test device 106.

At block 510, the test controller device 104 may receive raw data collected by the high-speed camera 108. The high-speed camera 108 may be positioned to face the display of the test device 106. The high-speed camera 108 may capture video data of the resulting animations and changes rendered on the display of the test device 106. In some embodiments, the raw data collected by the high-speed camera 108 may be received in response to the completion of the execution of the test events on the test device 106. In some embodiments, the raw data collected by the high-speed camera 108 may be received in response to the camera detecting an absence of animations rendered on the display of the test device 106 for a pre-determined time period. For example, the high-speed camera 108 may transmit the video data to the test controller device 104 in response to determining that the display of the test device 106 is static for at least ten seconds.

At block 515, the AVA engine 250 of the test controller device 104 may process the data collected by the high-speed camera 108. In some embodiments, the AVA engine 250 may parse the video data collected by the high-speed camera 108. The AVA engine 250 may apply one or more computer vision techniques to the parsed video data. In some embodiments, the AVA engine 250 may apply object recognition techniques (e.g., object identification, object detection, and/or object recognition) and/or motion analysis techniques.

At block 520, the DPA engine 268 may generate test results based at least in part on the received analyzed data and the processed data. In some embodiments, the analysis module 248 may receive the processed video data from the AVA engine 250. The analysis module 248 may generate test results based at least in part on one or more analysis parameters, the analyzed data from the test device 106, and the processed data received from the AVA engine 250. In some embodiments, the analysis module 248 may use the processed data to check the accuracy of the analyzed data. In some embodiments, the analysis module 248 may compare the analyzed data with the processed data to verify the accuracy of the analyzed data and generate test results.

In some embodiments, the analysis module 248 may generate a report based at least in part on the analyzed data from the test device 106. For example, the report may comprise a summary and/or results of the execution of the test events on the test device 106. In some embodiments, the test events may have specified that commands be executed in multiple iterations (e.g., thousands of iterations) to measure performance. The report may aggregate the results of the multiple iterations of the execution of the test events. The report may also include various analytic measurements of the analyzed data, such as medians, standard deviations, means, and so forth of the various results from the execution of the test events. In some embodiments, the report may be a comma-separated value file and/or a JSON file. In some embodiments, the analysis module 248 may generate one or more visual graphics based at least in part on the analyzed data and may include the visual graphics in the report.

At block 525, the analysis module 248 may optionally transmit the generated test results and/or the analyzed data from the test device(s) 106 to a datastore 110. In some embodiments, the analysis module 248 may transmit the generated test results, the analyzed data, the processed data, and/or the generated report to the datastore 110.

In some embodiments, the analysis module 248 may retrieve historic data from the datastore 110. The analysis module 248 may generate a report that includes a comparison of the historic data with the analyzed data, a summary of the analyzed data, a summary of the processed data from the high-speed camera 108, and/or a summary of the data analyzed by the test device 106. In some embodiments, the analysis module 248 may transmit the report to one or more datastores 110 for storage or later use.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:

receiving input relating to testing of a device, wherein the input comprises a semantic input indicating a test to be performed and one or more analysis parameters indicating an analysis to be performed on test data, the semantic input corresponding to one or more simulated gestures with respect to a display;

converting the semantic input to a test event;

transmitting the test event to the device for testing;

transmitting instructions to a camera directed at the device to capture a display of the device during the test event as video data;

receiving a first set of data from the device and a second set of data from the camera, wherein the first set of data is based at least in part on the test event and the second set of data comprises the video data;

parsing the video data;

identifying a first change to the display of the device during the test event by applying an object recognition technique or motion analysis technique to the parsed video data, and comparing the parsed video data to the first set of data from the device;

generating test results using the identified first change between the first set of data from the device and the parsed video data; and causing presentation of the test results.

2. The non-transitory computer-readable medium of claim 1, wherein the one or more simulated gestures comprise one or more commands to launch an application on the device, one or more commands to open content, one or more commands to traverse through content, one or more commands to close content, one or more commands to switch content, one or more commands to acquire content, one or more commands to delete content, one or more commands to restart the device, or one or more gesture-based inputs.

3. The non-transitory computer-readable medium of claim 2, wherein the gesture-based inputs comprise a tap gesture, a touch gesture, or a swipe gesture.

4. The non-transitory computer-readable medium of claim 1, wherein the computer-executable instructions cause the processor to perform further operations comprising:

transmitting the first set of data to a datastore.

5. A computer-implemented method comprising:

receiving, by one or more processors, input comprising one or more analysis parameters and one or more test events, wherein at least a portion of the input corresponds to one or more simulated gestures with respect to a display;

transmitting, by the one or more processors, the input to a device for testing;

receiving, by the one or more processors, a first set of data from the device and a second set of data from a camera, wherein the first set of data is based at least in part on the one or more test events and the one or more analysis parameters, and the second set of data comprises video data;

processing, by the one or more processors, the video data;

applying an object recognition technique or motion analysis technique to a portion of the video data to identify a difference between the first set of data from the device and the portion of the video data;

generating test results using the difference between the first set of data from the device and the portion of the video data; and causing, by the one or more processors, presentation of the test results.

6. The computer-implemented method of claim 5, wherein processing the second set of data further comprises parsing the video data and applying an object recognition technique or motion analysis technique to the parsed video data.

7. The computer-implemented method of claim 6, further comprising:

calculating, by the one or more processors, a latency associated with a transition of content using the first set of data and the processed second set of data.

8. The computer-implemented method of claim 5, wherein the camera is positioned to face a display of the device and the method further comprises:

capturing, by the camera, the second set of data, wherein the second set of data comprises video data recording changes displayed on the display of the device.

9. The computer-implemented method of claim 5, wherein the input comprises semantic inputs corresponding to one or more simulated gestures with respect to a display.

10. The computer-implemented method of claim 9, further comprising:

converting, by the one or more processors, the semantic inputs to test events.

11. The computer-implemented method of claim 10, wherein the semantic inputs comprise one or more commands to launch an application on the device, one or more commands to open content, one or more commands to traverse through the content, one or more commands to close content, one or more commands to switch content, one or more commands to acquire content, one or more commands to delete content, one or more commands to restart the device, or one or more gesture-based inputs, wherein the gesture-based inputs further comprise a tap gesture, a touch gesture, or a swipe gesture.

12. The computer-implemented method of claim 5, further comprising:

transmitting, by the one or more processors, the first set of data to a datastore.

13. The computer-implemented method of claim 5, further comprising:

retrieving, by the one or more processors, historic data from a datastore.

14. The computer-implemented method of claim 13, further comprising:

generating, by the one or more processors, a second report, wherein the second report comprises a comparison of the historic data with at least one of the first set of data or the second set of data.

15. A system comprising:
at least one memory storing computer-executable instructions; and
at least one processor, wherein the at least one processor is configured to access the at least one memory and to execute the computer-executable instructions to:
receive input comprising one or more analysis parameters and one or more test events, wherein at least a portion of the input corresponds to one or more simulated gestures with respect to a display;
transmit the input to a device for testing;
receive a first set of data from the device and a second set of data from a camera, wherein the first set of data is based at least in part on the one or more test events and the one or more analysis parameters and the second set of data comprises video data;
process the second set of data from the camera;
apply an object recognition technique or motion analysis technique to a portion of the video data to identify a difference between the first set of data from the device and the processed second set of data;
generate test results using the difference between the first set of data from the device and the processed second set of data; and
cause presentation of the test results.

16. The system of claim 15, wherein to process the second set of data, the at least one processor is further configured to execute the computer-executable instructions to:
parse the video data and apply an object recognition technique or motion analysis technique to the parsed video data.

17. The system of claim 16, wherein the at least one processor is further configured to execute the computer-executable instructions to:
calculate a latency associated with a transition of content using the first set of data and the processed second set of data.

18. The system of claim 15, wherein the camera is positioned to face a display of the device and wherein the at least one processor is further configured to execute the computer-executable instructions to:
capture, by the camera, the second set of data, wherein the second set of data comprises video data recording changes displayed on the display of the device.

19. The system of claim 15, wherein the input comprises semantic inputs corresponding to one or more simulated gestures with respect to a display.

20. The system of claim 19, wherein the at least one processor is further configured to execute the computer-executable instructions to:
convert the semantic inputs to test events.

21. The system of claim 20, wherein the semantic inputs comprise one or more commands to launch an application on the device, one or more commands to open content, one or more commands to traverse through the content, one or more commands to close content, one or more commands to switch content, one or more commands to acquire content, one or more commands to delete content, one or more commands to restart the device, or one or more gesture-based inputs, wherein the gesture-based inputs further comprise a tap gesture, a touch gesture, or a swipe gesture.

22. The system of claim 15, wherein the at least one processor is further configured to execute the computer-executable instructions to:
transmit the first set of data to a datastore.

23. The system of claim 15, wherein the at least one processor is further configured to execute the computer-executable instructions to:
retrieve historic data from a datastore.

24. The system of claim 23, wherein the at least one processor is further configured to execute the computer-executable instructions to:
generate a second report, wherein the second report comprises a comparison of the historic data with at least one of the first set of data or the second set of data.

* * * * *